United States Patent [19]
Schilling

[11] Patent Number: 5,179,571
[45] Date of Patent: Jan. 12, 1993

[54] SPREAD SPECTRUM CELLULAR HANDOFF APPARATUS AND METHOD

[75] Inventor: Donald L. Schilling, Sands Point, N.Y.

[73] Assignee: SCS Mobilecom, Inc., Port Washington, N.Y.

[21] Appl. No.: 727,617

[22] Filed: Jul. 10, 1991

[51] Int. Cl.$^5$ ............................................. H04L 27/30
[52] U.S. Cl. ...................................................... 375/1
[58] Field of Search .................. 375/1; 455/33, 54, 59, 455/69

[56] References Cited

U.S. PATENT DOCUMENTS

| | | | |
|---|---|---|---|
| 4,425,642 | 1/1984 | Moses et al. | 375/1 |
| 4,862,178 | 8/1989 | Sturza et al. | 375/1 |
| 4,977,578 | 12/1990 | Ishigaki et al. | 375/1 |
| 4,984,247 | 1/1991 | Kaufmann et al. | 375/1 |
| 5,056,109 | 10/1991 | Gilhousen et al. | 375/1 |

Primary Examiner—Salvatore Cangialosi
Attorney, Agent, or Firm—David Newman & Associates

[57] ABSTRACT

An apparatus for controlling handoff in a spread-spectrum-CDMA-communications system, of radio devices moving from a cell having a base station which transmits a first spread-spectrum-communications signal with a first generic-chip-code signal, toward a different cell having a base station for transmitting a second spread-spectrum-communications signal with a second generic-chip-code signal. A radio device includes a PCN antenna, a first matched filter having an impulse response matched to the first generic-chip-code signal and a first detector for detecting the first generic-chip-code signal embedded in the first spread-spectrum-communications signal. A second matched filter has an impulse response matched to the second generic-chip-code signal and a second detector detects the second generic-chip-code signal embedded in the second spread-spectrum-communications signal. A comparator generates a comparison signal by comparing the first detected signal with the second detected signal. A receiver-message-chip-code generator generates a replica of the message-chip-code signal and a message mixer, using a replica of the message-chip-code signal, despreads the spread-spectrum-communications signal as a modulated-data signal. A synchronization circuit, based on the comparison signal being greater than a threshold, synchronizes the receiver-message-chip-code generator to the first generic-chip-code signal for receiving the first spread-spectrum-communications signal, and in response to the comparison signal being less than the threshold, synchronizes the receiver-message-chip-code generator to the second generic-chip-code signal for receiving the second spread-spectrum-communications signal. A control unit switches transmitting the message data, spread-spectrum processed with a message-chip-code signal, embedded in the first spread-spectrum-communications signal from the first base station, to the second spread-spectrum-communications signal transmitted from the second base station.

16 Claims, 8 Drawing Sheets

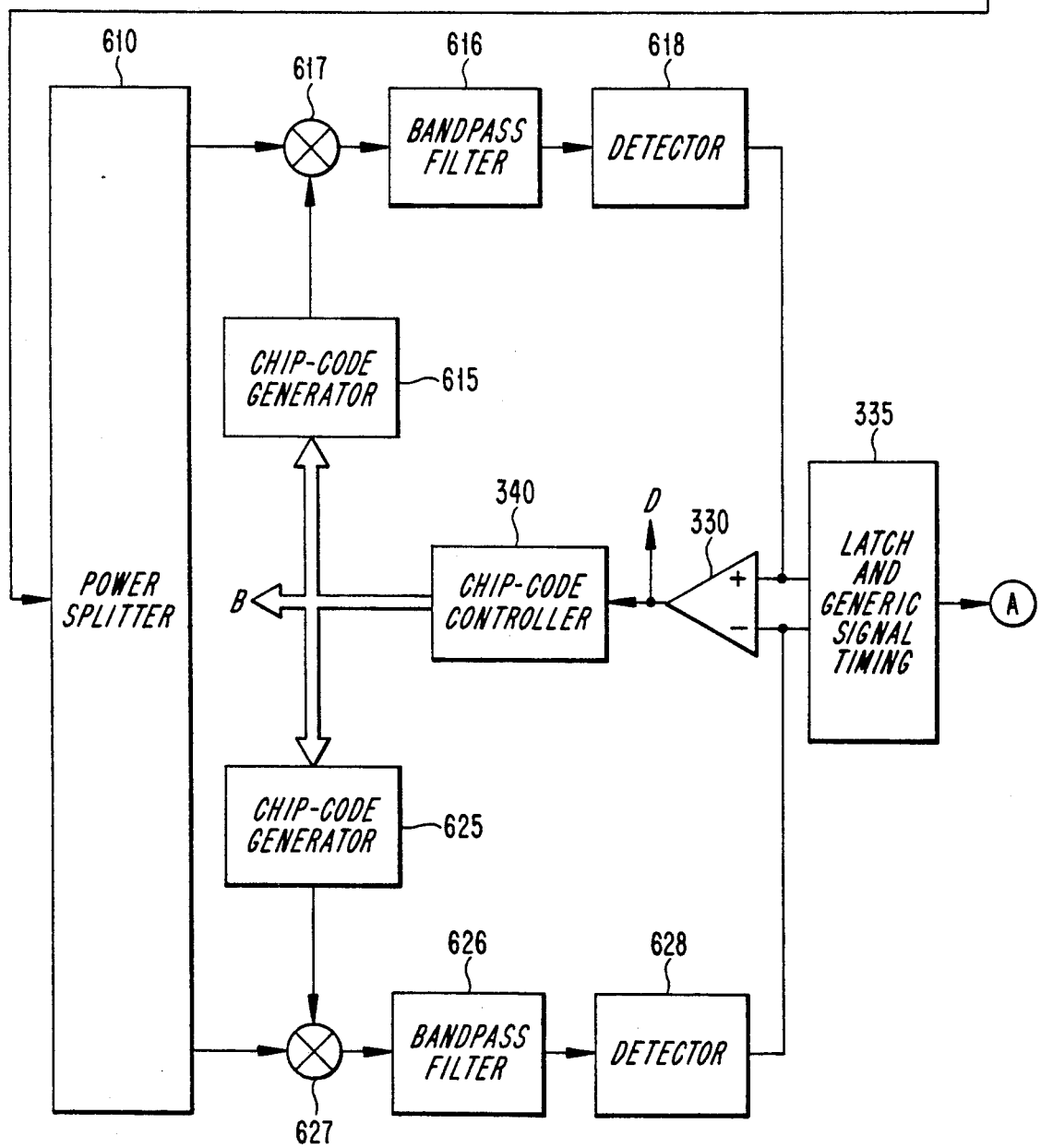

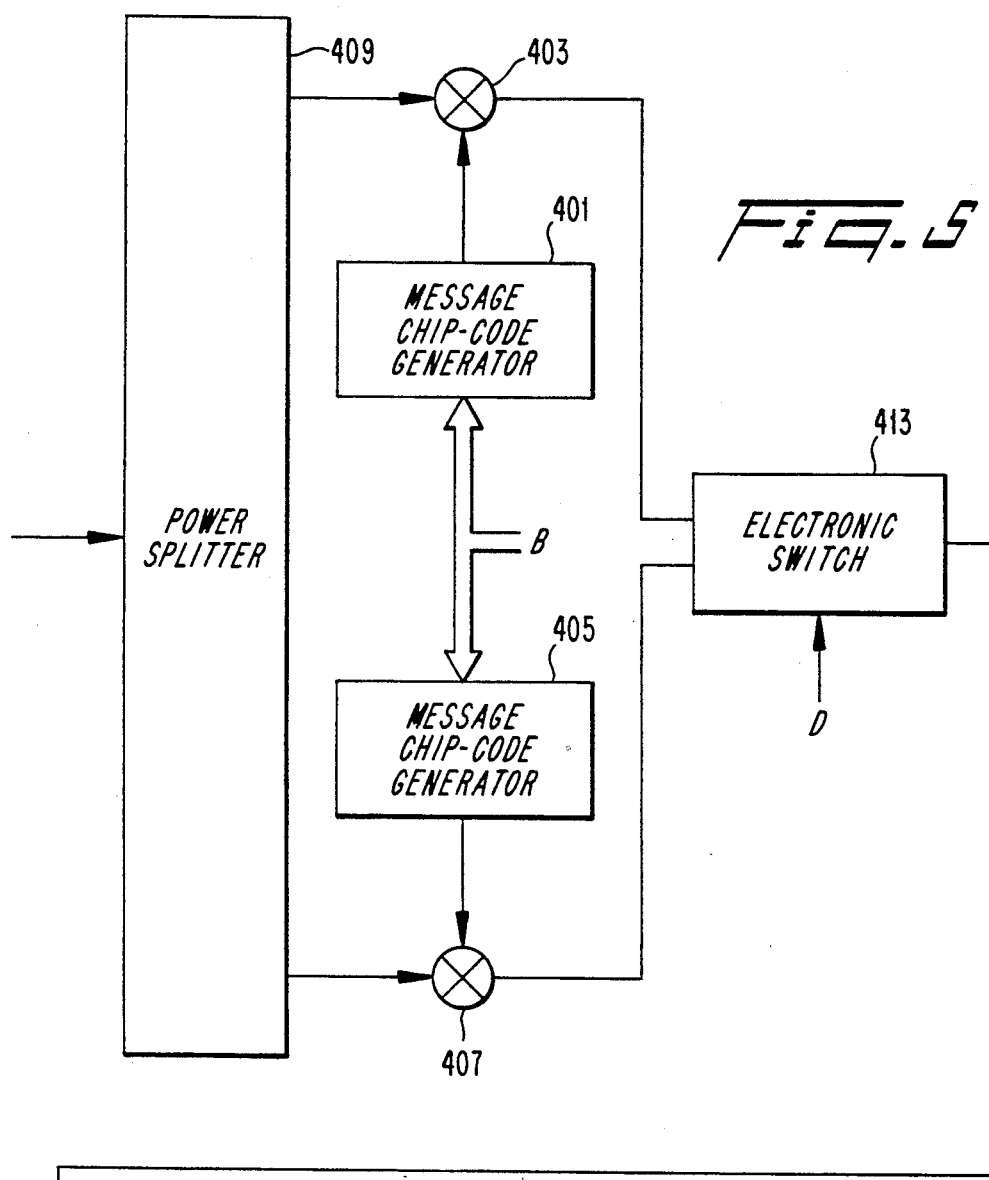
FIG.6
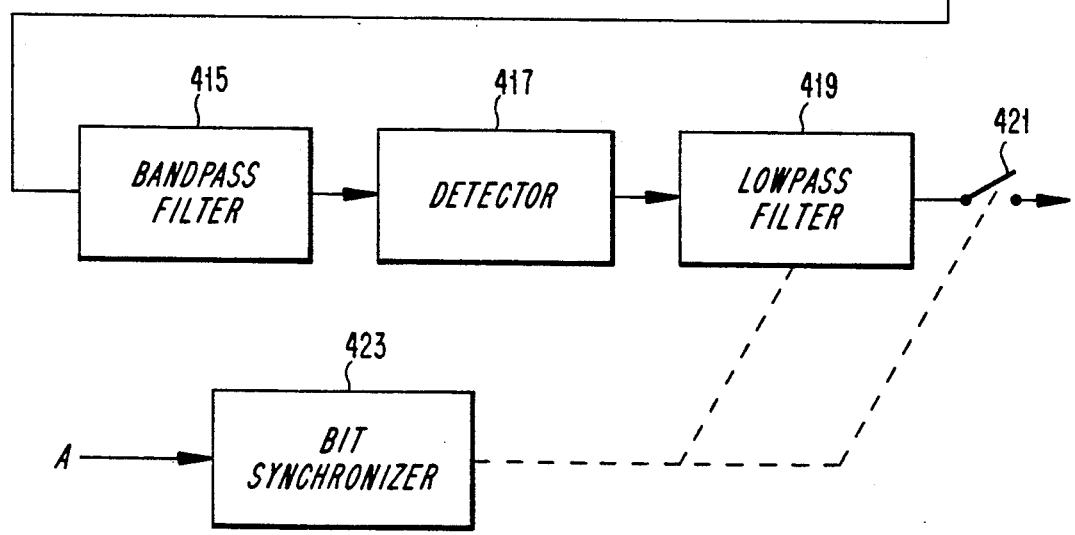

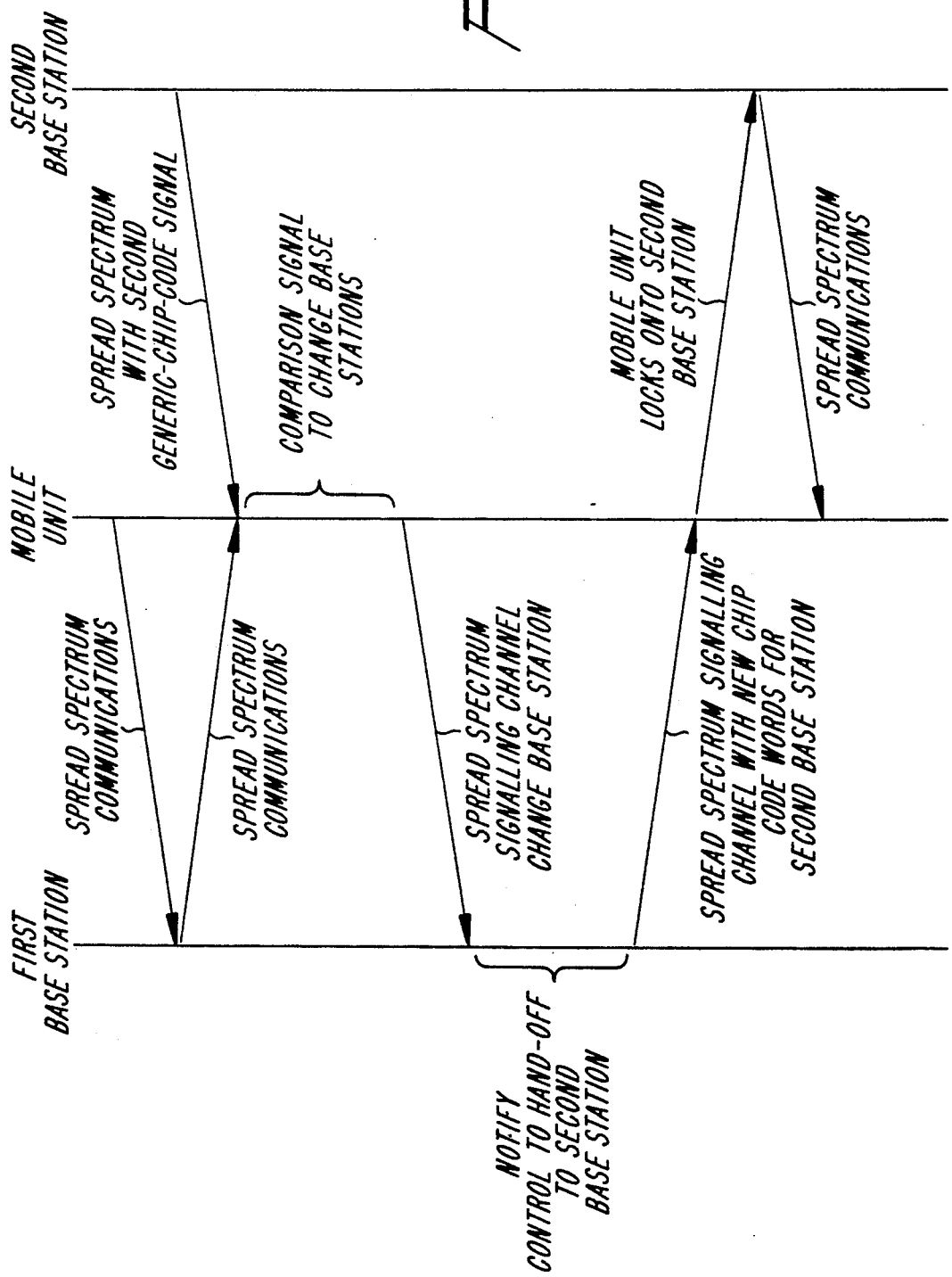

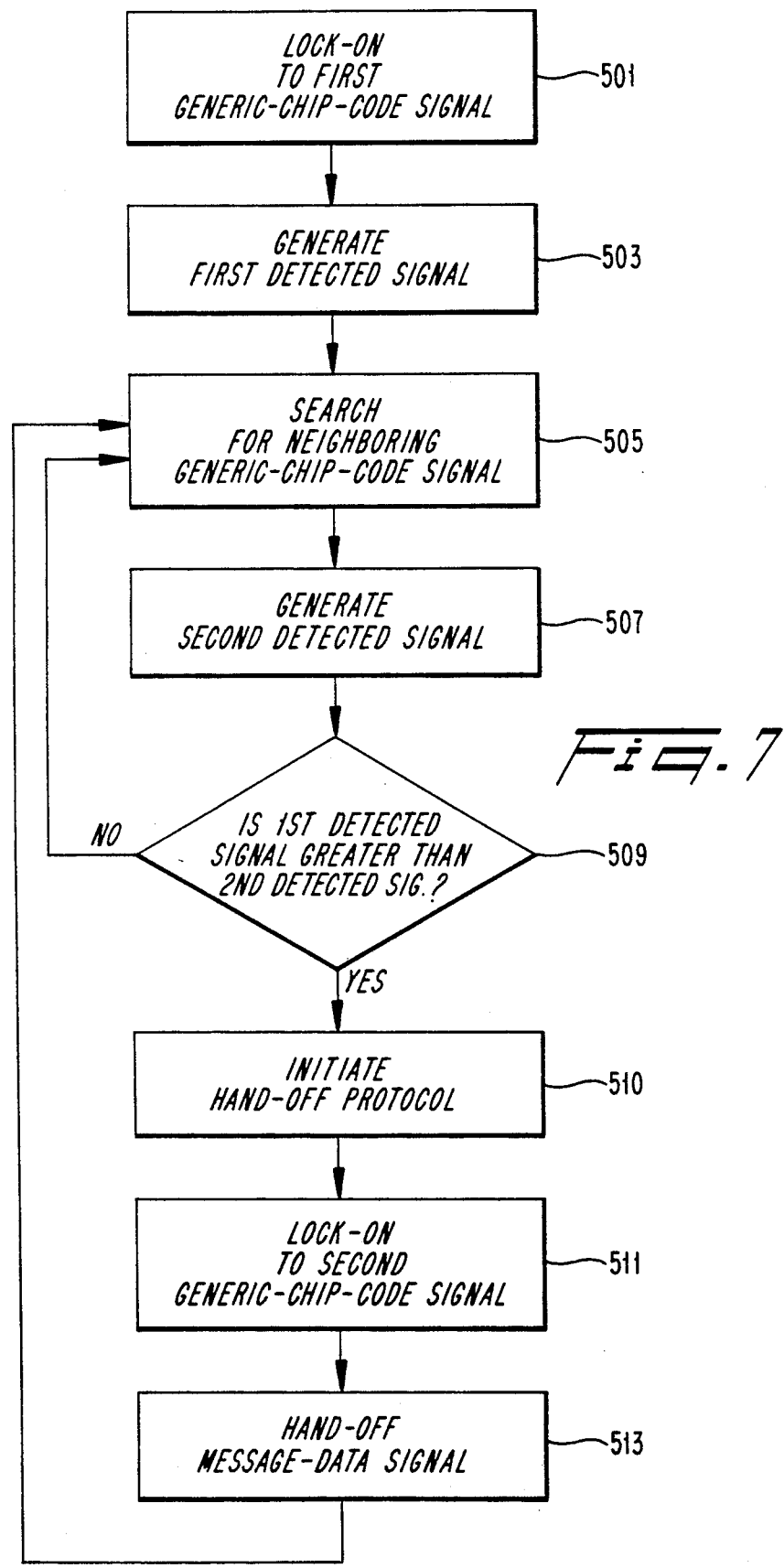

SPREAD SPECTRUM CELLULAR HANDOFF APPARATUS AND METHOD

RELATED PATENTS

This invention is related to the disclosures in U.S. patent application No. 07,622,235, having filing date of Dec. 14, 1990, entitled, SPREAD SPECTRUM CDMA COMMUNICATIONS SYSTEM by Donald L. Schilling; U.S. patent application No. 07/614,816, having filing date of Nov. 16, 1990, and entitled ADAPTIVE POWER CONTROL FOR A SPREAD SPECTRUM TRANSMITTER by Donald L. Schilling; U.S. patent application No. 07/614,827, having filing date of Nov. 16, 1990, and entitled SPREAD SPECTRUM MULTIPATH RECEIVER APPARATUS AND METHOD by Donald L. Schilling; and, U.S. patent application No. 07/626,109, having filing date of Dec. 14, 1990, and entitled SPREAD SPECTRUM COMMUNICATIONS SYSTEM AND METHOD by Donald L. Schilling, which are all incorporated herein by reference.

BACKGROUND OF THE INVENTION

This invention relates to spread-spectrum communications and more particularly to a system and method for handing off a telephone conversation from one base station to another when the mobile radio device is moving from one cell to another cell in a CDMA cellular spread-spectrum system.

DESCRIPTION OF THE PRIOR ART

Many mobile communications systems employ multiple coverage areas to accommodate necessary mobile communications over a defined region. Of such systems, simulcast communication systems and cellular communication systems are the most common types which provide hand-offs between coverage areas. In simulcast communication systems, a relatively simple hand-off technique is used. Simulcast communication systems involve linking together the respective coverage areas of a plurality of communication sites to form a large wide area coverage. The system typically employs communication channels which are common to each individual coverage area. As a mobile radio exits the coverage area of one site and enters the coverage area of another site, a conversation on the mobile radio is maintained because the linking of the multiple sites allows for simultaneous reception and broadcasting of the conversation at each site on the same channel.

Unlike simulcast communication systems, cellular communications systems do not employ common communication channels between the various sites. Rather, each coverage area employs a base site which includes a number of base stations for providing radiotelephones within the base site coverage area with a number of radiotelephone communication channels which are unique with respect to adjacent base site coverage areas. Each base site is controlled by the system's central switch controller.

A hand-off between two base sites in the present FDMA cellular communications system may be accomplished through communication between the radiotelephone and the radio equipment at the base site from which the radiotelephone is exiting. The base site equipment periodically measures the signal strength of the radiotelephone during the conversation, and, once it reaches a relatively low signal strength threshold, the same base site equipment sends a message to the adjacent base sites to determine which base site the radiotelephone is entering. The radiotelephone is then instructed to communicate on a selected channel from the base site equipment associated with the coverage area the radiotelephone is entering.

A cellular spread-spectrum-CDMA system communicates using message data, which may require continuous, uninterrupted communications. When a mobile station moves from a first cell to a second cell, the chip-codeword used for spread-spectrum processing the channel containing the digital data has to be handed-off so as to not interrupt communications. The power method used for the cellular voice communications system employing FM channels may not work as well for a spread-spectrum CDMA system because the time required to switch, i.e., hand-off, a user may result in the loss of considerable digital data. In addition, the CDMA system employs cells which may be placed close to one another, e.g., say 1000 feet apart. In such a case the switching time is far more critical than when the cells are 3 miles apart, which is typical for todays FDMA systems.

Accordingly, a system for providing a hand-off between coverage areas in a spread-spectrum-CDMA system is needed which overcomes the aforementioned deficiencies.

OBJECTS OF THE INVENTION

It is a general object of the present invention to provide a cellular direct sequence spread-spectrum-CDMA-communications system which overcomes the foregoing shortcomings.

It is a more particular object of the present invention to provide a cellular spread-spectrum-CDMA-communications system which ensures that a radiotelephone hand-off will be successful without loss of data.

Additional objects of the present invention include providing an improved radiotelephone, an improved base site and an improved switch controller which operate in accordance with the cellular spread-spectrum-CDMA-communications system of the present invention.

SUMMARY OF THE INVENTION

According to the present invention, as embodied and broadly described herein, a spread spectrum hand-off system for use between two cells in a cellular spread-spectrum-CDMA-communications system is provided comprising control means and a plurality of cells with each cell having a base station for transmitting one or more spread-spectrum-communications signal. The present invention is illustrated, by way of example, with a radio device moving from a first cell which has a first base station, to a neighboring cell which has a second base station. The first cell is assumed to be surrounded by $N-1$ cells, and each of the base stations in these $N-1$ cells transmits a spread-spectrum generic-chip-code signal which is different from the other cells and the first cell. There are, therefore, N generic-chip-code signals in a CDMA cellular system which has M cells ($M>>N$). The generic-chip-code signals are repeatedly used in different cells, such that cells with the same generic-chip-code signal are a maximum distance apart. This is called "chip-codeword reuse". The mobile radio device scans the $N-1$ generic-chip-code signals until the radio detects a generic-chip-code signal which produces a voltage level at an output of a detector which is greater than the generic-chip-code signal of the first cell, and also exceeds a predetermined threshold. The generic-chip-code-signal which meets this criteria is deemed to originate from a second cell which has a second base station.

The first base station transmits a first spread-spectrum-communications signal with a first generic-chip-code signal embedded therein. The second base station transmits a second spread-spectrum-communications signal with a second generic-chip-code signal embedded therein. The spread-spectrum-CDMA-communications system has control means for switching message and signalling data, which are spread-spectrum processed with a first set of message-chip-code signals embedded in the first spread-spectrum-communications signal transmitted from the first base station, to being spread-spectrum processed with a second set of message-chip-code signals and embedded in the second spread-spectrum-communications signal transmitted from the second base station.

Operating within a cell is a plurality of mobile user hand-held radio devices with each having a personal-communications-network (PCN) antenna, first generic-detection means, second generic-detection means, comparator means, message-spread-spectrum-processing means, message-detection means, and chip-codeword-synchronization means. The first generic-detection means is coupled to the PCN antenna and has first generic-spread-spectrum-processing means. The first generic-detection means detects the first generic-chip-code signal embedded in the first spread-spectrum-communications signal communicated from the first PCN-base station. After detection of the first generic-chip-code signal, the first generic-detection-means outputs a first detected signal. The second generic-detection means is coupled to the PCN antenna and includes second generic-spread-spectrum-processing means. The second generic-detection means detects the second generic-chip-code signal embedded in the second spread-spectrum-communications signal communicated from the second PCN-base station. After detection of the second generic-chip-code signal the second generic-detection means outputs a second detected signal. The comparator means generates a comparison signal by comparing the first detected signal with the second detected signal. By repetitively changing the generic-chip-code signal used by the second generic-detection means, the $N-1$ spread-spectrum-communications signals are effectively scanned. Thus, the second detected signal can be a voltage level which is proportioned to the detected $N-1$ generic-chip-code signals emanating from the $N-1$ neighboring base stations.

The message-spread-spectrum-processing means is coupled to the PCN antenna and despreads the first spread-spectrum-communications signal and/or second spread-spectrum-communications signal as a modulated-data signal. When the comparison signal is greater than a threshold, then the chip-codeword-synchronization means synchronizes the message-spread-spectrum-processing means and the detection means to the first generic-chip-code signal. Thus, the message-spread-spectrum-processing means despreads the first spread-spectrum-communications signal transmitted from the first base station. When the comparison signal is less than the threshold, then hand-off data are sent, as signalling data, through a spread-spectrum channel from the mobile station to the first base station. The hand-off data directs the first base station to hand-off the mobile unit to a second base station. In response to receiving the hand-off signal, the first base station notifies control means to hand-off the mobile station to the second base station. The control means sends the first base station one or more spread-spectrum chip codewords which are relayed to the mobile station. The chip codewords are communicated through a spread-spectrum channel from the first base station to the mobile station as signalling data. The mobile station will use the spread-spectrum chip codewords for communicating with the second base station. Upon receiving the chip codewords, the message-spread-spectrum-processing means at the mobile station breaks communications with the first base station and initiates spread-spectrum communications with the second base station.

If required, the chip-codeword-synchronization means at the mobile station synchronizes the message-spread-spectrum-processing means and the detection means to the second generic-chip-code signal. Resynchronization may not be required if all the base stations are synchronized to a common clock or timing signal. Accordingly, the message-spread-spectrum-processing means at the mobile station despreads the second spread-spectrum-communications signal transmitted from the second base station. At this point the second generic-spread-spectrum-processing means is locked onto the second generic-chip-code signal and the first generic-spread-spectrum-processing means is used for repetitively searching for a generic-chip-code signal emanating from a neighboring cell and meeting the criteria for handoff.

The present invention also includes a method for controlling hand-off in a spread-spectrum-CDMA-communications system, of a radio device moving from a first cell having a first base station which transmits a first spread-spectrum-communications signal with a first generic-chip-code signal embedded therein, toward a second cell having a second base station which transmits a second spread-spectrum-communications signal with a second generic-chip-code signal embedded therein. The spread-spectrum-CDMA-communications system has a control unit for switching message data, spread-spectrum processed with a first set of message-chip-code signals embedded in the first spread-spectrum-communications signal transmitted from the first base station, to the second spread-spectrum-communications signal spread spectrum processed with a second set of message-chip-code signals transmitted from the second base station.

The method has the step of scanning a plurality of generic-chip-code signals until a generic-chip-code signal which produces a voltage level at an output of a detector is greater than the other scanned generic-chip-code signals, and also exceeds a predetermined threshold. The generic-chip-code signal that meets this criteria is labeled the second generic-chip-code signal.

The method includes detecting the first generic-chip-code signal embedded in the first spread-spectrum-communications signal communicated from the first base station, detecting the second generic-chip-code signal embedded in the second spread-spectrum-communications signal communicated from the second base station and outputting a first detected signal and a second detected signal, respectively. The method generates a comparison signal by comparing the first detected signal with the second detected signal. Using message-spread-spectrum-processing means, the method despreads the spread-spectrum-communications signal as a modulated-data signal. When the comparison signal is greater than a threshold, the message-spread-spectrum-processing means uses the first generic-chip-code signal for processing the first spread-spectrum-communications signal transmitted from the first base station. When the comparison signal is less than the threshold, then first hand-off data is sent as signalling data from the mobile station to the first base station. The first base station then notifies control means to hand-off the mobile station to the second base station. One or more chip codewords are sent from the control means through the first base station to the mobile station. The mobile station then breaks communications with the first base station and initiates spread-spectrum communications with the second base station, using the one or more chip codewords received from the control means. The generic-spread-spectrum-processing means at the mobile station uses the second generic-chip-code signal for receiving the second spread-spectrum-communications signal transmitted from the second base station.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 4B is an expanded diagram of the radio device for the mobile station;

FIG. 5 is an expanded diagram of a message portion of a radio device;

FIG. 6 is a timing diagram of a protocol; and

FIG. 7 is a flowchart of a method for handing off between two cellular base stations.

DETAILED DESCRIPTION OF THE PREFERRED EMBODIMENTS

Figure 1:
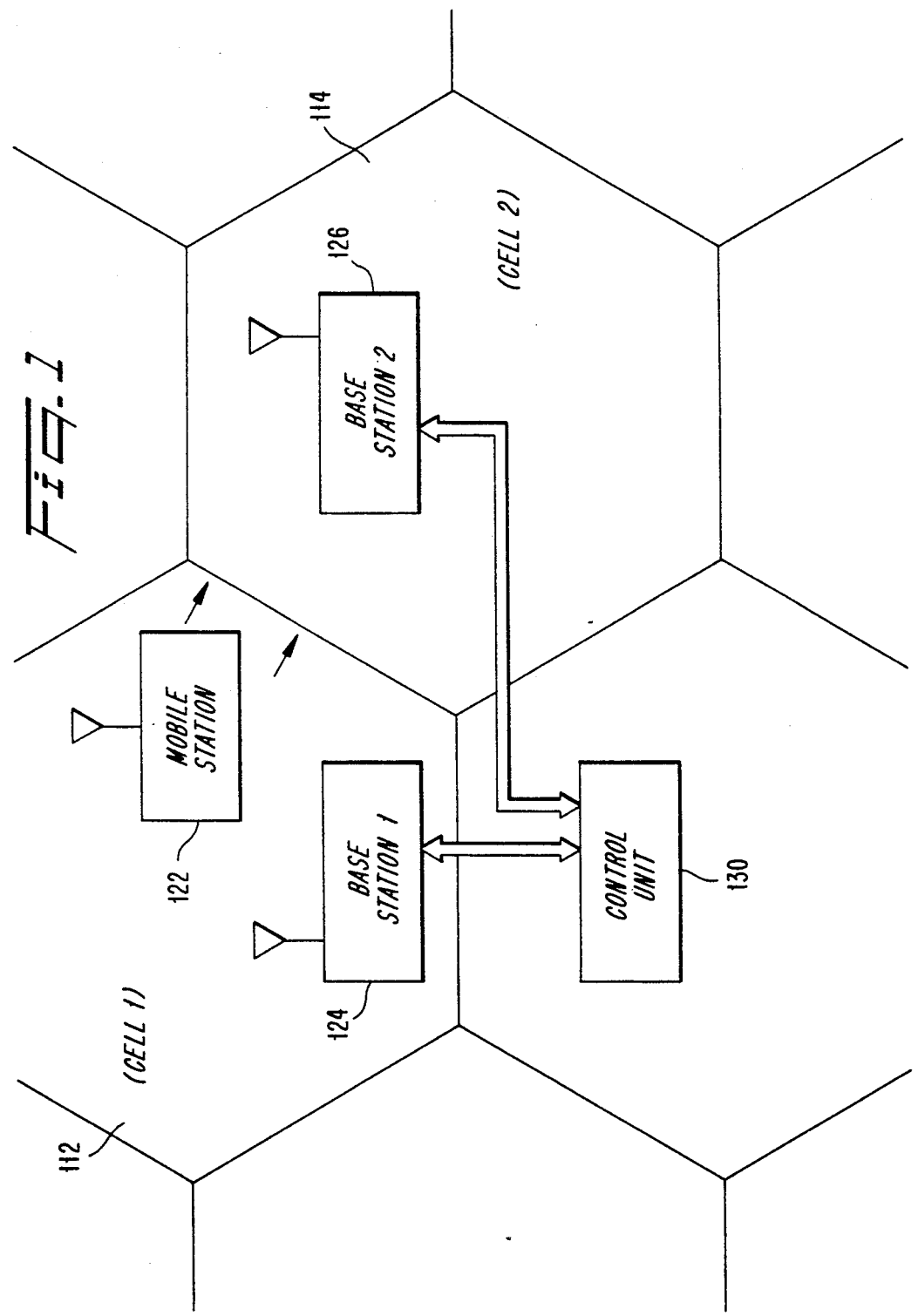
FIG. 1 is a diagram of a cellular, spread-spectrum-CDMA-communications system including two base stations and a control unit.

Reference will now be made in detail to the present preferred embodiments of the invention, examples of which are illustrated in the accompanying drawings, wherein like reference numerals indicate like elements throughout the several views.

The arrangement disclosed in this specification has particular use for handing-off of radio communication in a mobile radiotelephone unit, from one cell to another in a cellular infrastructure of a spread-spectrum-CDMA-communications system, without loss of data bits. More particularly, the arrangement disclosed herein is directed to ensuring that an attempted hand-off of a radio unit in such an infrastructure is successful.

The present invention is illustrated, by way of example, with a radio device moving from a first cell which has a first base station, to a neighboring cell. The first cell is assumed to be surrounded by N−1 cells. Each of the base stations in these N−1 cells transmits a spread-spectrum-communications signal using a generic-chip-code signal which is different from the other cells and the first cell. All cells transmit the spread-spectrum communication signal at the same carrier frequency. The radio device scans the N−1 generic-chip-code signals of the neighboring cells. The scanning continues until the output voltage level of the detector which detects the scanned generic-chip-code signals exceeds a predetermined threshold and is greater than the output voltage levels of the other scanned generic-chip-code signals. The generic-chip-code signal which meets this criteria is deemed to originate from a second cell which has a second base station.

FIG. 1 illustrates a unique cellular spread-spectrum-CDMA-communications system which, in simplified form, includes a first base station 124 and a second base station 126 for two geographic spread-spectrum-CDMA communications areas (cells) 112, 114, respectively. In a preferred embodiment six cells are adjacent to a given cell, as shown for the second cell 114. Each cell adjacent to the given cell, i.e. the second cell 114, uses a different chip codeword from the second cell 114 and from each other. This permits reuse of chip codewords.

Figure 2:
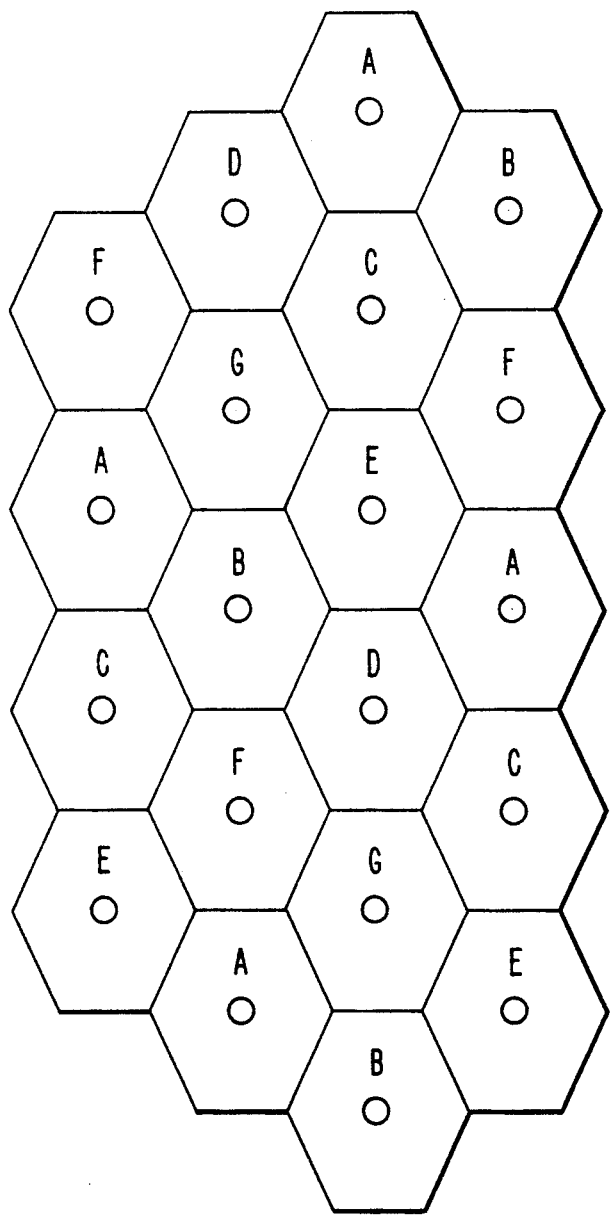
FIG. 2 is a diagram of cellular, spread-spectrum CDMA showing chip codeword reuse.

FIG. 2 illustrates generic chip codeword reuse in a cellular CDMA environment, where the N−1 cells adjacent to a particular cell using generic chip codeword A, use N−1 different generic chip codewords, respectively. There are N generic-chip-code signals used in a CDMA cellular system which has a total of M cells (M>>N). The generic-chip-code signals are repeatedly used in the cells, such that the cells with the same generic-chip-code signals are a maximum distance apart, and no two adjacent cells use the same generic-chip-code signal. FIG. 2 shows for N=7 there are six adjacent cells using six different generic chip codewords, B, C, D, E, F and G. This pattern is repeated throughout the cellular geographic area.

Referring to FIG. 1, for the first cell 112, the first base station 124 includes a spread-spectrum transmitter for transmitting a first spread-spectrum-communications signal with a first generic-chip-code signal embedded therein. The first base station 124 also has a spread-spectrum receiver for receiving a spread-spectrum-communications signal, with the first generic-chip-code signal embedded therein. For the second cell 112, the second base station 124 includes a spread-spectrum transmitter for transmitting a second spread-spectrum-communications signal with a second generic-chip-code signal embedded therein. The second base station 124 also includes a spread-spectrum receiver for receiving a spread-spectrum-communications signal, with the second generic-chip-code signal embedded therein. The generic-chip-code signals for transmitting and receiving at a particular base station may be different.

The spread-spectrum-CDMA-communications system has control means, embodied as a control unit 130, for switching message and signaling data, spread-spectrum processed with a message-chip-code signal embedded in the first spread-spectrum-communications signal transmitted from the first base station, to the second spread-spectrum-communications signal transmitted from the second base station.

For purposes of exemplifying the hand-off operation of the present invention, a mobile station 122 which has an improved radio device is depicted in transition from the first cell 112 to the second cell 114. Overall control of the first base station 124 and the second base station 126 is provided by a signal processing unit of a cellular switch controller, located in a control unit 130.

Figure 3:
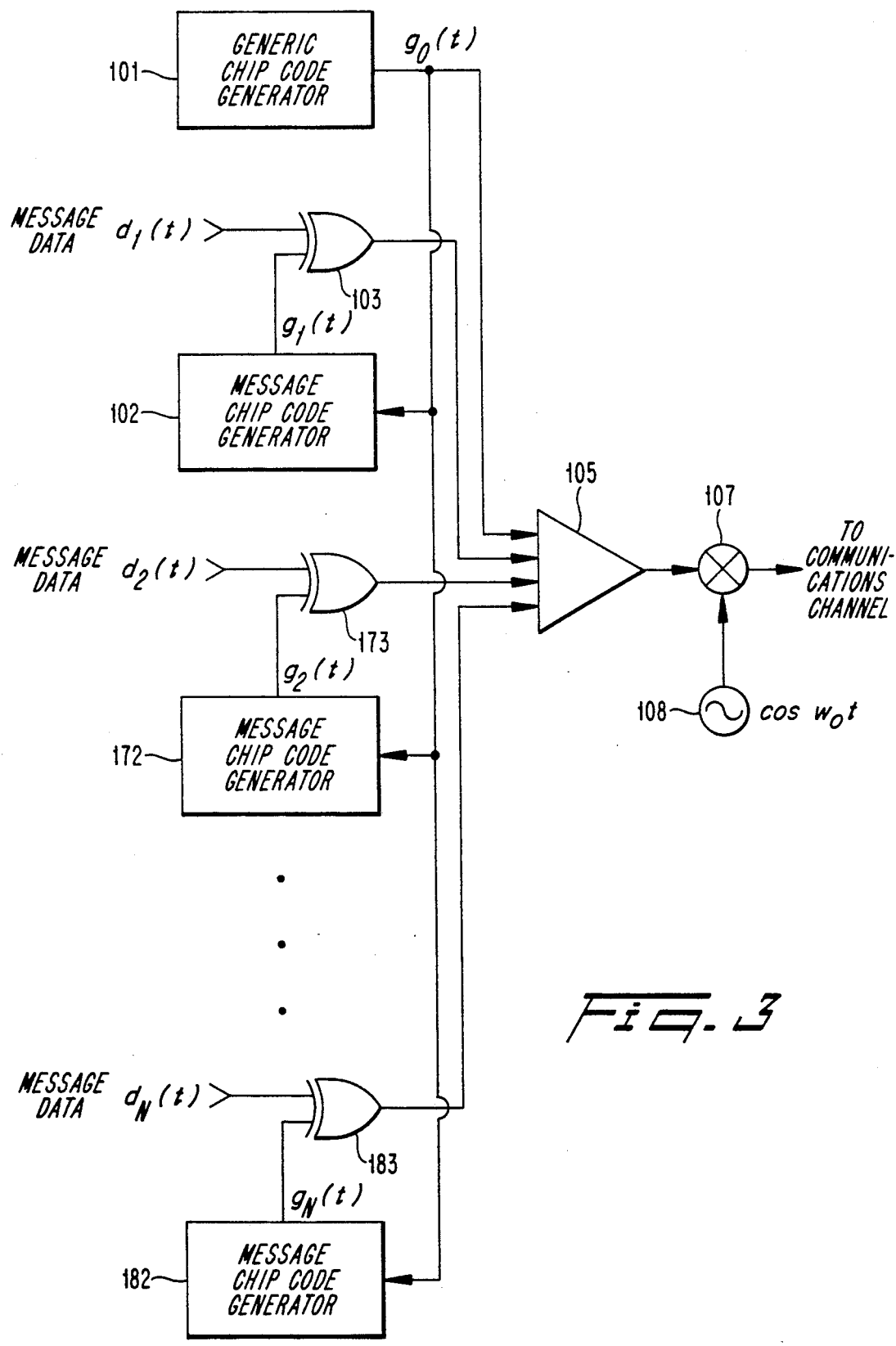
FIG. 3 shows a synchronous spread-spectrum transmitter at a base station.

Each base station and mobile station has a transmitter for transmitting the spread-spectrum-communications signal, which may include a plurality of spread-spectrum-processed signals for handling a plurality of message and signalling data. The transmitter is coupled to a plurality of message means and a plurality of spreading means. Referring to FIG. 3, the plurality of message means may be embodied as a plurality of transmitter-message-chip-code generators and the plurality of spreading means may be embodied as a plurality of EXCLUSIVE-OR gates. The plurality of transmitter-message-chip-code generators generates a plurality of message-chip-code signals. The plurality of transmitter-message-chip-code generators is shown as first transmitter-message-chip-code generator 102 generating first message-chip-code signal, $g_1(t)$, second transmitter-message-chip-code generator 172 generating second message-chip-code signal, $g_2(t)$, through $N^{th}$ transmitter-message-chip-code generator 182 generating $N^{th}$ message-chip-code signal, $g_N(t)$. The plurality of EXCLUSIVE-OR gates is shown as first EXCLUSIVE-OR gate 103, second EXCLUSIVE-OR gate 173, through $N^{th}$ EXCLUSIVE-OR gate 183. The plurality of EXCLUSIVE-OR gates generates a plurality of spread-spectrum-processed signals by modulo-2 adding the plurality of message and signalling data $d_1(t)$, $d_2(t)$, ..., $d_N(t)$ with the plurality of message-chip-code signals $g_1(t)$, $g_2(t)$, ..., $g_N(t)$, respectively. More particularly, the message data, $d_1(t)$, are modulo-2 added with the first message-chip-code signal, $g_1(t)$, the signalling data, $d_2(t)$, are modulo-2 added with the second message-chip-code signal, $g_2(t)$, through the $N^{th}$ message and/or signalling data, $d_N(t)$, which are modulo-2 added with the $N^{th}$ message-chip-code signal, $g_N(t)$.

The transmitter-generic-chip-code generator 101 is coupled to the plurality of transmitter-message-chip-code generators and the source for the plurality of message and signalling data, $d_1(t)$, $d_2(t)$, ... $d_N(t)$. The generic-chip-code signal $g_0(t)$, in a preferred embodiment, provides synchronous timing for the plurality of message-chip-code signals $g_1(t)$, $g_2(t)$, ..., $g_N(t)$, and the plurality of message and signalling data $d_1(t)$, $d_2(t)$, ..., $d_N(t)$.

The combiner 105 combines the generic-chip-code signal and the plurality of spread-spectrum-processed signals, by adding the generic-chip-code signal with the plurality of spread-spectrum-processed signals. The combined signal typically is a multilevel signal, which has the instantaneous voltage levels of the generic-chip-code signal and the plurality of spread-spectrum-processed signals.

The modulator 107, as part of the transmitter, modulates the combined generic-chip-code signal and the plurality of spread-spectrum-processed signals by a carrier signal, $\cos w_o t$, at a carrier frequency, $f_o$. The modulated generic-chip-code signal and the plurality of spread-spectrum processed signals are transmitted over the communications channel as a spread-spectrum-communications signal, $x_c(t)$. While the transmitter may use a linear power amplifier for optimum performance, a nonlinear power amplifier also may be used without significant degradation or loss in performance.

For the spread-spectrum-CDMA-communications system, illustrated in FIG. 1, the first spread-spectrum-communications signal, $x_{c1}(t)$, transmitted from the first base station has the form:

$$x_{c1}(t) = \left( g_{10}(t) + \sum_{i=1}^{N} [g_{1i}(t) \oplus d_{1i}(t)] \right) \cos w_o t$$

Thus, the first spread-spectrum-communications signal includes the first generic-chip-code signal, $g_{10}(t)$, and a first plurality of spread-spectrum-processed signals, for $i=1, ..., N$, as if they were each modulated separately, and synchronously, on separate carrier signals with the same carrier frequency, $f_o$, and transmitted over the communications channel.

Similarly, the second spread-spectrum-communications signal, $x_{c2}(t)$, transmitted from the second base station 126 has the form:

$$x_{c2}(t) = \left( g_{20}(t) + \sum_{j=1}^{M} [g_{2j}(t) \oplus d_{2j}(t)] \right) \cos w_o t$$

Thus, the second spread-spectrum-communications signal includes the second generic-chip-code signal, $g_{20}(t)$, and a second plurality of spread-spectrum-processed signals, for $j=1, ..., M$, as if they were each modulated separately, and synchronously, on separate carrier signals with the same carrier frequency, $f_o$, and transmitted over the communications channel.

Figure 4A:
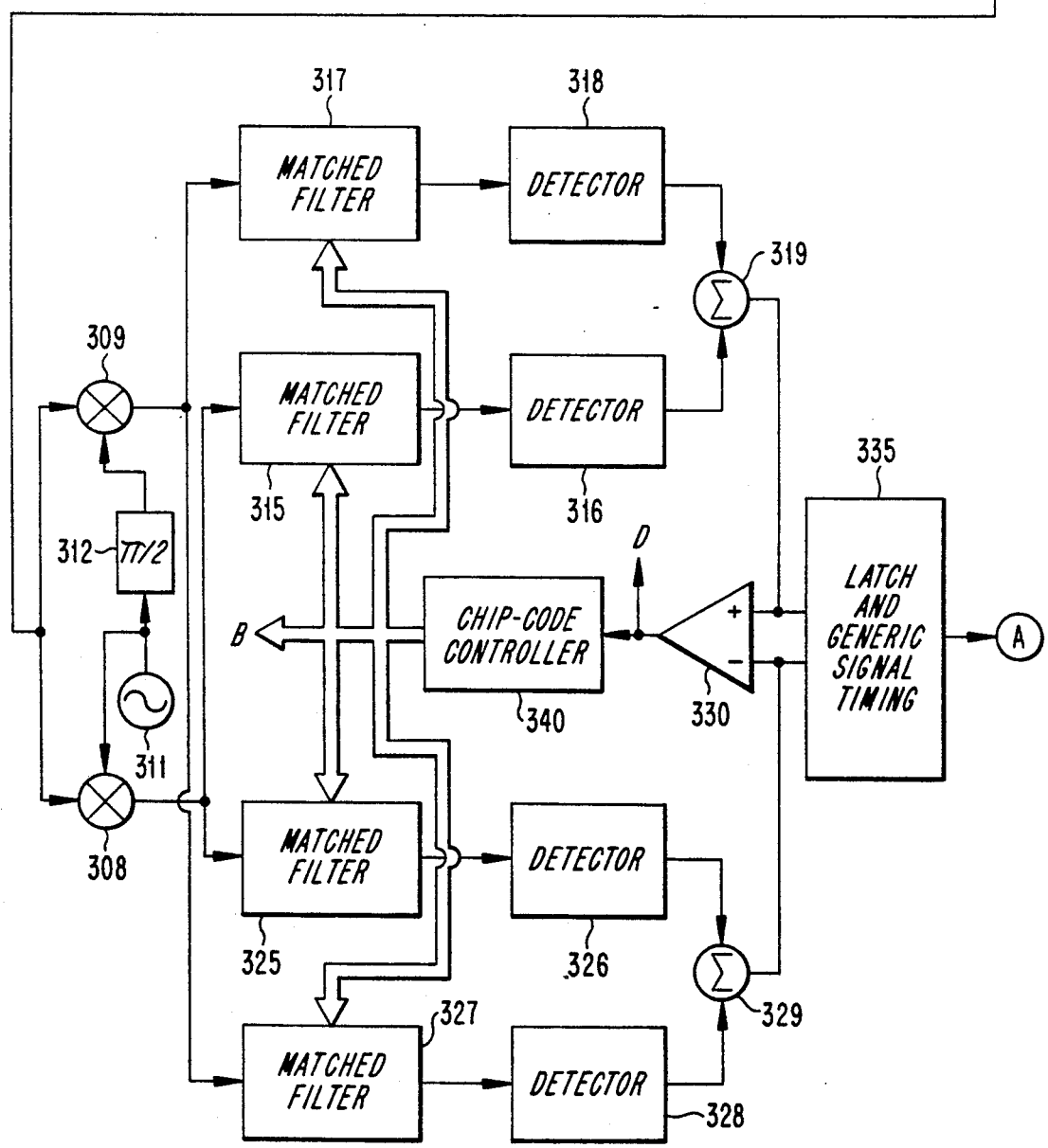
FIG. 4A is an expanded diagram of the radio device for the mobile station.

The improved mobile-user, hand-held, radio device for the mobile station 122 includes a PCN antenna, first generic-detection means, second generic-detection means, comparator means, controller means, message-spread-spectrum-processing means, message-detection means and synchronization means. In FIG. 4A, elements of the radio device, by way of example, are shown in expanded form. A PCN antenna 301 is coupled through a low noise amplifier (LNA) 303, down converter 305 and automatic gain control (AGC) 307 to a first receiver mixer 308 and a second receiver mixer 309. The first receiver mixer 308 is coupled to a signal source 311, and the second receiver mixer 309 is coupled through a 90° phase shifter 312 to the signal source 311. The first receiver mixer 308 multiplies the local signal from the signal source 311 with a received signal to generate an in-phase signal. The second mixer 309 multiplies the 90° phase-shifted version of the local signal from the signal source 311 with the received signal to generate a quadrature-phase signal.

The first generic-detection means and the second generic-detection means as illustrated in FIG. 4B may be embodied using a correlation receiver such as a first and second generic-chip-code generator 615, 625, first and second mixer 617, 627 and first and second bandpass filter 616, 626, or, as illustrated in FIG. 4A, may be embodied using a first and second matched filter 317, 325 and a first detector 318, 326. The generic-chip-code generators and matched filter typically are programmable or adjustable, for adapting to different generic-chip-code signals embedded in spread spectrum-communications signals, transmitted from each base transmitter in different cells.

The controller means, embodied as a chip-code controller 340, sets which generic-chip-code signal the correlation receiver or matched filter is using. The chip-code controller 340 can repetitively change the generic-chip-code signal used by the correlations receiver or matched filter, so as to effectively scan through a plurality of generic-chip-code signals. In the cellular architecture of FIG. 1, the scanning would move through N−1=5 generic-chip-code signals which correspond to the five neighboring cells.

The first generic-detection means is shown in FIG. 4A, by way of example, embodied as including at least a first matched filter 315 and a first detector 316, and may further include a third matched filter 317 and a third detector 318. The first matched filter 315 is coupled between the first receiver mixer 308 and the first detector 316, and the third matched filter 317 is coupled between the second receiver mixer 309 and the third detector 318. The outputs of the first detector 316 and the third detector 317 are combined by first combiner 319. The first matched filter 315 and the third matched filter 317 have an impulse response matched to the first generic-chip-code signal. For the particular combination shown, the first matched filter 315 and first detector 316 detect the in-phase component of the received, first generic-chip-code signal. The third matched filter 317 and third detector 318 detect the quadrature-phase component of the received, first generic-chip-code signal.

A spread spectrum correlator may be used in place of a matched filter. The first generic-detection means is shown in FIG. 4B as a spread-spectrum correlator includes a first generic-chip-code generator 615, first generic mixer 617, first generic-bandpass filter 616 and first generic detector 618.

The second generic-detection means is shown in FIG. 4A embodied as including at least a second matched filter 325 and a second detector 326, and may further include a fourth matched filter 327 and a fourth detector 328. The second matched filter 325 is coupled between the first receiver mixer 308 and the second detector 326, and the fourth matched filter 327 is coupled between the second receiver mixer 309 and the fourth detector 328. The outputs of the second detector 326 and the fourth detector 328 are combined by second combiner 329. The second matched filter 325 and the fourth matched filter 327 have impulse responses matched to the second generic-chip-code signal. For the particular combination shown the second matched filter 325 and second detector 326 detect the in-phase component of the received, second generic-chip-code signal. The fourth matched filter 327 and the fourth detector 328 detect the quadrature-phase component of the received, second generic-chip-code signal.

A spread spectrum correlator may be used in place of a matched filter. Thus, the first generic-detection means is shown in FIG. 4B as a spread-spectrum correlator including a second generic-chip-code generator 625, second generic mixer 627, second generic-bandpass filter 626 and second generic detector 628.

The comparator means may be a comparator 330. The comparator 330 may be embodied as a differential amplifier, which produces a comparison signal at D. The comparator 330 is coupled to the output of the first combiner 319 and the output of the second combiner 329.

The first matched filter 315 and the first detector 316, along with the third matched filter 317 and the third detector 318, detect the first generic-chip-code signal embedded in the first spread-spectrum-communications signal, which is communicated from the first base station. The outputs of the first detector 316 and third detector 318 are combined by first combiner 319, and the detected first generic-chip-code signal is outputted as a first detected signal. The second matched filter 325 and the second detector 326, along with the fourth matched filter 327 and the fourth detector 328, detect the second generic-chip-code signal sequently and repetitively N−1 generic-chip-code signals until the generic-chip-code signal which produces a voltage level at an output of the second combiner 329 is greater than the other scanned generic-chip-code signals and also exceeds a predetermined threshold. The generic-chip-code signal which meets this criteria is deemed to originate from the second spread-spectrum-communications signal, which is communicated from the second base station. The output of the second detector 326 and fourth detector 328 are combined by second combiner 329, and the detected second generic-chip-code signal is outputted as a second detected signal. The comparator 330 compares the first detected signal with the second detected signal, and outputs a comparison signal. The comparison may be performed, for example, by subtracting the second detected signal from the first detected signal, using a differential amplifier.

When the comparison signal is greater than a threshold, the message-spread-spectrum processing means uses the first generic-chip-code signal for processing the first spread-spectrum-communications signal transmitted from the first base station. When the comparison signal is less than the threshold, the message-spread-spectrum-processing means uses the second generic-chip-code signal for processing the second spread-spectrum-communications signal transmitted from the second base station.

If a common clock or timing signal is used by all the base stations, then chip-codeword-synchronization means is not required. If a common clock or timing circuit is not used, then chip-codeword synchronization means is required. Many combinations of circuit elements may be used to accomplish the function of the chip-codeword-synchronization means. FIGS. 4A and 4B show, by way of example, a chip-codeword controller 340. The chip-codeword controller 340, in response to the comparison signal being greater than a threshold, can cause the message-spread-spectrum-processing means to despread a received spread-spectrum signal using a first message-chip-code signal. The first message-chip-code signal is assumed the appropriate chip-code signal using the chip codewords for despreading a desired spread-spectrum channel in the first spread-spectrum-communications signal communicated from the first base station. When the comparison signal is less than a threshold, the chip-codeword controller 340 can cause the message-spread-spectrum-processing means to despread a received spread spectrum signal using a second message-chip-code signal. The second message-chip-code signal is assumed the appropriate chip-code signal using the chip codeword for despreading the desired spread-spectrum channel in the second spread-spectrum-communications signal communicated from the second base station.

The chip-codeword controller 340 can facilitate searching for a generic-chip-code signal embedded in a spread-spectrum-communications signal transmitted from a neighboring cell. Assume that the mobile station 122 is located in a first cell 112. Assume further that a total of N different generic-chip-code signals are used in the system. Since the mobile station 122 is assumed located in the first cell 122 and operating with the first generic-chip-code signal, the mobile station 122 has a possible N−1 generic-chip-code signals through which to search. Any one of the N−1 generic-chip-code signals may be embedded in a spread-spectrum-communications signal transmitted from a neighboring cell. The chip-codeword controller 340 can sequentially rotate through the N−1 generic-chip-code signals to sequentially change the impulse response of the second and fourth matched filter 325, 327, or if a correlation receiver is used, of a second generic-chip-code generator 625 which outputs a generic-chip-code signal for mixing with a second mixer 627, the received spread-spectrum-communications signal.

The comparator means may further be embodied as part of a digital signal processor, which compares the voltage level of the second detected signal for each of the N−1 generic-chip-code signals. The comparator means, after detecting the second detected signal which has the largest voltage level and which is also above a preset threshold, can set the chip-codeword controller 340 to "lock-on" to the corresponding generic-chip-code signal. The "lock-on" can be performed by setting the impulse response of the second and fourth matched filters 325, 327 to the second detected signal. The searched and acquired generic-chip-code signal is referred to as the second generic-chip-code signal for handing-off between the first cell 112 and second cell 114.

FIG. 1 shows, by way of example, each cell having six adjacent cells. Thus, a total of seven (N=7) generic-chip-code signals are used, one for the first cell 112, and one each for the six adjacent cells. While the mobile station 122 is locked onto the first generic-chip-code signal of the first cell 112, the chip-codeword controller 340 would scan through the six generic-chip-code signals of the adjacent cells.

When the chip-codeword controller 340 is set to lock-on to the corresponding generic-chip-code signal, then thru the chip-codeword controller 340 can use the first and third matched filters 315, 317 for scanning for the generic-chip-code signal which meets the criteria for the next hand-off. Thus, the chip-codeword controller 340 can flip back and forth between first generic-detection means and second generic-detection means using one for detecting the generic channel in the spread-spectrum-communication signal currently being received and the other for scanning.

FIG. 5 shows an expanded diagram of the message-spread-spectrum-processing means embodied, by way of example, as a message receiver, which can be used with the present invention. The message-spread-spectrum-processing means, as illustrated in FIG. 5, includes a first message-chip-code generator 401 and a first message mixer 403. The message-spread-spectrum-processing means additionally may include a second message-chip-code generator 405 and a second message mixer 407. The first message mixer 403 and the second message mixer 407 may be coupled through a power splitter 409 to the PCN antenna. Alternatively, only the first message-chip-code 401 generator is sufficient since the chip-codeword controller 340 can change the message-chip-code signal almost instantly with the first message-chip-code generators 401.

Also shown are electronic switch 413, bandpass filter 415, detector 417, lowpass filter 419, sampler 421 and bit synchronizer 423. The first message mixer 403 is coupled between the power splitter 409 and the electronic switch 413, and to the first message-chip-code generator 401. The second message mixer 407 is coupled between the power splitter 409 and the electronic switch 413, and to the second message-chip-code generator 405. The first message-chip-code generator 401 and the second message-chip-code generator 405 are coupled, B, to the chip-codeword controller 340 of FIGS. 4A and 4B. The bandpass filter 415, detector 417, lowpass filter 419 and sampler 421 are connected in series, respectively, at the output of the electronic switch 413. A bit synchronizer 423 is connected to the lowpass filter 419 and sampler 421, and to latch and generic signal timing circuit 335 of FIGS. 4A and 4B.

For the embodiment shown in FIG. 5, when the mobile station 122 is in transition from the first cell 112 to the second cell 114 of FIG. 1, the first message-chip-code generator 401 uses a replica of the first message-chip-code signal which was transmitted by a first transmitter as illustrated in FIG. 3, and located at the first base station 124. The first message-chip-code signal is used by the first transmitter to spread-spectrum process message data. Additional message-spread-spectrum-processing means may be used for receiving additional message data and signalling data channels.

As the mobile station 112 approaches the second cell 114, the comparator means detects the second detected signal which has the largest voltage and is above the present threshold, the chip-codeword controller 340 sets a replica of the second message-chip-code signal to the second message-chip-code generator 405. Accordingly, the second message-chip-code generator 405 uses a replica of the second message-chip-code signal which is used with a second transmitter as illustrated in FIG. 3, and located at the second base station 126. The second message-chip-code signal is used by the second transmitter to spread-spectrum process message. The chip codeword used for generating the second message-chip-code signal is communicated to the mobile station 112 using a signalling channel, in response to the mobile station 112 sending hand-off data to the first base station. Additional message-spread-spectrum-processing means may be used and switched from using the first set of message-chip-code signals to the second set of message-chip-code signals, for receiving message data and signalling data channels.

While the mobile station 122 is located in the first cell 112, the first detector 316 and the third detector 318 detect the first generic-chip-code signal transmitted from the first transmitter, and output the first detected signal. As the mobile station 122 moves toward the second cell 114, the second detector 326 and fourth detector 328 detect the second generic-chip-code signal transmitted from the second transmitter, and output the second detected signal. As previously mentioned, the second generic-chip-code signal and consequently the second detected signal, may be derived from scanning N−1 generic-chip-code signals.

When the first detected signal is greater than the second detected signal, the comparison signal at the output of the comparator 330 is, by way of example, a positive voltage level. The electronic switch 413, accordingly, causes the message portion of the radio device to receive the despread first spread-spectrum-communications signal using the first message mixer 403.

This is illustrated in FIG. 6 with the mobile unit communicating with the first base station using spread spectrum communications.

The mobile station 122 continuously receives one or more spread-spectrum signals with each having a generic-chip-code signal. When the second detected signal, due to one of the detected generic-chip-code signals, is greater than the first detected signal, the comparison signal at the output of the comparator 330 is, by way of example, a negative voltage level, and the mobile station 122 initiates the protocol to change to the second base station 126. Thus, hand-off data, which indicate change base station, are sent as signalling data through a spread-spectrum channel from the mobile station 122 to the first base station 124, to handoff the mobile station 122 to a second base station 126. In response to receiving the hand-off data, the first base station 124 notifies the control unit 130 to hand-off the mobile station 122 to the second base station 126. The control unit 130 sends the first base station 124 the one or more spread spectrum chip codewords, which are relayed to the mobile station 122. The chip codewords are communicated through a spread-spectrum channel from the first base station 124 to the mobile station 122 as signalling data. The mobile station 122 will use the spread spectrum chip codewords for communicating with the second base station 126. Upon receiving the chip codewords, the message-spread-spectrum-processing means at the mobile station 122 breaks communications with the first base station 124 and initiates spread-spectrum communications with and locks onto the second base station 126. Also, the electronic switch 413, accordingly, causes the message portion of the radio device to receive the despread second spread-spectrum-communications signal using the second message mixer 407.

Thus, depending on the setting of the electronic switch 413, the output of either the first message mixer 403 or the second message mixer 407 is filtered by the bandpass filter 415, detected by detector 417, filtered by lowpass filter 419 and sampled by sampler 421.

The latch and generic signal timing circuit 335 is coupled to the output of the first combiner 319 and the output of the second combiner 329. The latch and generic signal timing circuit 335 latches to the stronger of the first detected signal or the second detected signal, and generates a timing signal synchronized to the stronger of the first detected signal and the second detected signal. The bit synchronizer 423, responsive to the timing signal from latch and generic signal timing circuit 335, controls the integrate and dump functions of the lowpass filter 419 and sampler 421.

The present invention also includes a method for controlling hand-off in a spread-spectrum-CDMA-communications system, of radio devices moving from a first cell having a first base station, toward a second cell having a second base station. The first base station transmits a first spread-spectrum-communications signal with a first generic-chip-code signal embedded therein. The second base station transmits a second spread-spectrum-communications signal with a second generic-chip-code signal embedded therein. The spread-spectrum-CDMA-communications system has a control unit for switching message and signalling data, spread-spectrum processed with a message-chip-code signal embedded in the first spread-spectrum-communications signal transmitted from the first base station, to the second spread-spectrum-communications signal transmitted from the second base station.

Referring to FIG. 7, the method assumes that the radio device is locked-on 501 to the first generic-chip-code signal. The method has the step of scanning a plurality of generic-chip-code signals until a generic-chip-code signal which produces a voltage level at an output of a detector is greater than the other scanned generic-chip-code signals, and also exceeds a predetermined threshold. The generic-chip-code signal that meets this criteria is labeled the second generic-chip-code signal.

The method includes detecting the first generic-chip-code signal embedded in the first spread-spectrum-communications signal communicated from the first PCN-base station, detecting the second generic-chip-code signal embedded in the second spread-spectrum-communications signal communicated from the second PCN-base station, and outputting 503, 505 a first detected signal and a second detected signal, respectively. The second generic-chip-code signal can be searched 505 from a multiplicity (N − 1) of spread-spectrum-communications signals. The method generates a comparison signal by comparing 509 the first detected signal with the second detected signal.

Using message-spread-spectrum-processing means, the method despreads either the first spread-spectrum-communications signal or the second spread-spectrum-communications signal as a modulated-data signal. When the comparison signal is greater than a threshold, the message-spread-spectrum-processing means synchronizes to the first generic-chip-code signal for processing the first spread-spectrum-communications signal transmitted from the first base station. When the comparison signal is less than the threshold, then a protocol is initiated 510 by sending hand-off signalling data through a spread spectrum channel to the first base station. New chip codewords are sent from the first base station to the mobile station. Upon receiving the new chip codewords, the message-spread-spectrum-processing means synchronizes 511 to the second generic-chip-code signal for receiving the second spread-spectrum-communications signal transmitted from the second base station. Accordingly, the message-data signal is handed-off 513 from the first cell to the second cell.

In use, the first base station 124 transmits the first spread-spectrum-communications signal, which includes a first generic-chip-code signal and message and signalling data spread-spectrum processed with a first message-chip-code signal. The second base station 126 transmits the second spread-spectrum-communications signal, which includes a second generic-chip-code signal and message and signalling data spread-spectrum-processed with a second message-chip-code signal. The generic-chip-code signal embedded in the spread-spectrum-communications signal communicated from the second base station is assumed to have been found from a searching algorithm, as described previously from a multiplicity of spread-spectrum-communications signals. The radio device, which is in transition from the first cell 112 to the second cell 114, receives the first spread-spectrum-communications signal and the second spread-spectrum-communications signal through the PCN antenna, low noise amplifier 303 and down converter 305. An AGC 307 adjusts the power or voltage level of the received signals. At least a first matched filter 315 is coupled to the AGC, and has an impulse response matched to the first generic-chip-code signal. The first detector 315 detects a first pulse at an output of the first matched filter 315 when the first generic-chipcode signal passes through the first matched filter 315, and outputs the detected signal as a first detected signal. At least a second matched filter 325 is coupled to the AGC 307 and has an impulse response matched to the second generic-chip-code signal. The second detector 326 detects a second pulse at an output of the second matched filter 325 when the second generic-chip-code signal passes through the second matched filter. The second detector 326 outputs a second detected signal.

A comparison signal is generated by comparing the first detected signal with the second detected signal. The first message-chip-code generator 401 generates a replica of the first message-chip-code signal and the second message-chip-code signal. The first message-chip-code signal may be the same as the second message-chip-code signal, depending on application.

The first message mixer 403 is coupled to the first message-chip-code generator 401 and the PCN antenna. Using the replica of the message-chip-code signal, the first message mixer 403 despreads the first spread-spectrum-communications signal or the second spread-spectrum-communications signal as a modulated-data signal. The message-bandpass filter filters the modulated-data signal. The message detector demodulates the modulated-data signal as received data.

A synchronization circuit is coupled to the comparator. When the comparison signal is greater than a threshold, the synchronization circuit synchronizes the first message-chip-code generator 401 to the first generic-chip-code signal for receiving the first spread-spectrum-communications signal which was transmitted from the first base station 124. When the comparison signal is less than the threshold, the synchronization circuit synchronizes the receiver-message-chip-code generator to the second generic-chip-code signal for receiving the second spread-spectrum-communications signal from which was transmitted the second base station 126.

The control unit 130 which is coupled to the first base station 124 and the second base station 126 switches the message and signalling data spread-spectrum processed with a message-chip-code signal, embedded in the first spread-spectrum-communications signal transmitted from th first base station 124, to the second spread-spectrum-communications signal transmitted from the second base station 126.

The message-chip-code signals for a particular base station transmitter may be stored in a memory as part of the chip-codeword controller 340, or may be updated as the mobile station 122 moves from cell to cell. In the latter case, one of the message and signalling data of FIG. 3 can be used as a signalling channel for updating the generic-chip-code signals and message-chip-code signals. An updated or new generic-chip code signal and message-chip-code signal for a new cell to which the mobile station is in transition can be controlled by control unit 130 and communicated from a base station using the signalling channel to the mobile station. The chip-codeword controller 340 is, therefore, updated with a new generic-chip-code signal and a new message-chip-code signal. The chip-codeword controller 340 can set the second matched filter 325 and fourth matched filter 327 to have an impulse response matched to the new generic-chip-code signal. The chip-codeword controller 340 also can set the second message-chip-code generator 405 to generate the new message-chip-code signal. As the mobile station 122 moves into the new cell, and the voltage level of the second detected signal increases to a level greater than the first detected signal, the electronic switch 413 switches to receiving the spread-spectrum processed signal to the second message mixer 407. Thus, a smooth transition can be made when handing-off from the first base station to the second base station.

The first message-chip-code signal is synchronized to the first generic-chip-code signal, and the second message-chip-code is synchronized to the second generic-chip-code signal. The bit synchronizer 423 typically receives bit synchronization timing from the first generic-chip-code signal or the second generic-chip-code signal, from chip-codeword controller 340. These concepts are taught in U.S. patent application No. 07/626,109, having a filing date of Dec. 14, 1990, entitled, SYNCHRONOUS SPREAD-SPECTRUM COMMUNICATIONS SYSTEM AND METHOD by Donald L. Schilling, which is incorporated herein by reference.

The transmitter in mobile station 122 may operate in a similar manner, as the base stations by having two spread-spectrum channels for communicating with the first base station and the second base station. The particular message-chip-code signals used for the transmitter of the mobile station 122 can be sent through the signalling channel, and controlled by chip-codeword controller 340.

The present invention may be part of a digital processing chip, a combination of digital signal processing chips and/or discrete components. The embodiments shown in the figures and disclosed herein are illustrative, with the invention encompassing the broader means plus function and/or methods disclosed herein.

It will be apparent to those skilled in the art that various modifications can be made to the spread-spectrum hand-off apparatus and method of the instant invention without departing from the scope or spirit of the invention, and it is intended that the present invention cover modifications and variations of the spread-spectrum hand-off apparatus and method provided they are within the scope of the appended claims and their equivalents.

I claim:

1. An apparatus for controlling handoff of radio devices moving from one cell toward an adjacent cell of a spread-spectrum-CDMA-communications system, each adjacent cell having its own generic-chip-code signal embedded in a spread-spectrum-communications signal, comprising:

a first base station for transmitting a first spread-spectrum-communications signal having a first generic-chip-code signal and message data spread-spectrum processed with a message-chip-code signal, embedded therein;

a second base station for transmitting a second spread-spectrum-communications signal having a second generic-chip-code signal embedded therein;

a radio device including,
   a personal-communications-network (PCN) antenna;
   a first matched filter coupled to said PCN antenna and having an impulse response matched to the first generic-chip-code signal;
   a first detector coupled to said first matched filter for detecting the first generic-chip-code signal embedded in the first spread-spectrum-communications signal communicated from said first base station and outputting a first detected signal;

a second matched filter coupled to said PCN antenna and having an impulse response matched to the second generic-chip-code signal;

a second detector coupled to said second matched filter for detecting the second generic-chip-code signal embedded in the second spread-spectrum-communications signal communicated from said second base station and outputting a second detected signal;

a comparator coupled to said first detector and to said second detector for generating a comparison signal by comparing the first detected signal with the second detected signal;

a receiver-message-chip-code generator for generating a replica of the message-chip-code signal;

a message mixer coupled to said receiver-message-chip-code generator and said PCN antenna, responsive to the replica of the message-chip-code signal, for despreading the spread-spectrum-communications signal as a modulated-data signal;

a message-bandpass filter coupled to said receiver-message-mixer device for filtering the modulated-data signal;

a message detector for demodulating the modulated-data signal as received data;

a synchronization circuit coupled to said comparator and responsive to the comparison signal being greater than a threshold, for synchronizing said receiver-message-chip-code generator to the first generic-chip-code signal for receiving the first spread-spectrum-communications signal from said first base station, and responsive to the comparison signal being less than the threshold for synchronizing said receiver-message-chip-code generator to the second generic-chip-code signal for receiving the second spread-spectrum-communications signal from said second base station; and a control unit coupled to said first base station and said second base station and to many other base stations for switching the message data spread-spectrum processed with a message-chip-code signal, embedded in the first spread-spectrum-communications signal transmitted from said first base station, to the second spread-spectrum-communications signal transmitted from said second base station.

2. An apparatus for controlling handoff of radio devices moving from one cell toward an adjacent cell of a spread-spectrum-CDMA-communications system, each adjacent cell having its own generic-chip-code signal embedded in a spread-spectrum-communications signal, comprising:

a first base station for transmitting a first spread-spectrum-communications signal having a first generic-chip-code signal embedded therein;

a second base station for transmitting a second spread-spectrum-communications signal having a second generic-chip-code signal embedded therein;

a radio device including, a personal-communications-network (PCN) antenna;

first generic-detection means coupled to said PCN antenna and including first generic-spread-spectrum-processing means, for detecting the first generic-chip-code signal embedded in the first spread-spectrum-communications signal communicated from said first base station and outputting a first detected signal;

second generic-detection means coupled to said PCN antenna and including second generic-spread-spectrum-processing means, for detecting the second generic-chip-code signal embedded in the second spread-spectrum-communications signal communicated from said second base station and outputting a second detected signal;

comparator means for generating a comparison signal by comparing the first detected signal with the second detected signal;

message-spread-spectrum-processing means coupled to said PCN antenna for despreading the spread-spectrum-communications signal as a modulated-data signal;

message-detection means for demodulating the modulated-data signal as received data;

synchronizing means responsive to the comparison signal being greater than a threshold, for synchronizing said message-spread-spectrum-processing means and said detection means to the first generic-chip-code signal for receiving the first spread-spectrum-communications signal transmitted from said first base station, and responsive to the comparison signal being less than the threshold for synchronizing said message-spread-spectrum-processing means and said detection means to the second generic-chip-code signal for receiving the second spread-spectrum-communications signal transmitted from said second base station; and control means for switching the message data spread-spectrum processed with a message-chip-code signal embedded in the first spread-spectrum-communications signal transmitted from said first base station, to the second spread-spectrum-communications signal transmitted from said second base station.

3. The apparatus as set forth in claim 2 further including:

chip-code means for controlling impulse responses of said first generic-detection means and said second generic-detection means.

4. The apparatus as set forth in claim 3 wherein said chip-code means controls an impulse response of said message-spread-spectrum-processing means.

5. The apparatus as set forth in claim 2 wherein:

said first generic-detection means includes a first matched filter having an impulse response matched to the first generic-chip-code signal; and said second generic-detection means includes a second matched filter having an impulse response matched to the second generic-chip-code signal.

6. The apparatus as set forth in claim 2 wherein:

said first generic-detection means includes a first correlator for correlating a received spread-spectrum-communications signal with the first generic-chip-code signal; and said second generic-detection means includes a second correlator for correlating a received spread-spectrum-communications signal with the second generic-chip-code signal.

7. The apparatus as set forth in claim 2 wherein said message-spread-spectrum-processing means includes a message-matched filter for despreading a received spread-spectrum-communications signal as a modulated-data signal.

8. The apparatus as set forth in claim 2 wherein said message-spread-spectrum-processing means includes a message-correlator for despreading the spread-spectrum-communications signal as a modulated-data signal.

9. An apparatus for controlling handoff in a spread-spectrum-CDMA-communications system, a radio device moving from a first cell having a first base station for transmitting a first spread-spectrum-communications signal with a first generic-chip-code signal embedded therein, toward a second cell having a second base station for transmitting a second spread-spectrum-communications signal with a second generic-chip-code signal embedded therein, said spread-spectrum-CDMA-communications system having a control unit for switching message data, spread-spectrum processed with a message-chip-code signal embedded in the first spread-spectrum-communications signal transmitted from said first base station, to the second spread-spectrum-communications signal transmitted from said second base station, said apparatus comprising:

a personal-communications-network (PCN) antenna;
first generic-detection means coupled to said PCN antenna and including first generic-spread-spectrum-processing means, for detecting the first generic-chip-code signal embedded in the first spread-spectrum-communications signal communicated from said first base station and outputting a first detected signal;
second generic-detection means coupled to said PCN antenna and including second generic-spread-spectrum-processing means, for detecting the second generic-chip-code signal embedded in the second spread-spectrum-communications signal communicated from said second base station and outputting a second detected signal;
comparator means for generating a comparison signal by comparing the first detected signal with the second detected signal;
message-spread-spectrum-processing means coupled to said PCN antenna for despreading the spread-spectrum-communications signal as a modulated-data signal; and
synchronizing means responsive to the comparison signal being greater than a threshold, for synchronizing said message-spread-spectrum-processing means to the first generic-chip-code signal for processing the first spread-spectrum-communications signal transmitted from said first base station, and responsive to the comparison signal being less than the threshold for synchronizing said message-spread-spectrum-processing means and said detection means to the second generic-chip-code signal for receiving the second spread-spectrum-communications signal transmitted from said second base station.

10. The apparatus as set forth in claim 9 further including:
chip-code means for controlling impulse responses of said first generic-detection means and said second generic-detection means.

11. The apparatus as set forth in claim 10 wherein said chip-code means controls an impulse response of said message-spread-spectrum-processing means.

12. The apparatus as set forth in claim 9 wherein:

said first generic-detection means includes a first matched filter having an impulse response matched to the first generic-chip-code signal; and
said second generic-detection means includes a second matched filter having an impulse response matched to the second generic-chip-code signal.

13. The apparatus as set forth in claim 9 wherein:
said first generic-detection means includes a first correlator for correlating a received spread-spectrum-communications signal with the first generic-chip-code signal; and
said second generic-detection means includes a second correlator for correlating a received spread-spectrum-communications signal with the second generic-chip-code signal.

14. The apparatus as set forth in claim 9 wherein said message-spread-spectrum-processing means includes a message-matched filter for despreading a received spread-spectrum-communications signal as a modulated-data signal.

15. The apparatus as set forth in claim 9 wherein said message-spread-spectrum-processing means includes a message-correlator for despreading the spread-spectrum-communications signal as a modulated-data signal.

16. A method for controlling handoff in a spread-spectrum-CDMA-communications system, of radio devices moving from a first cell having a first base station for transmitting a first spread-spectrum-communications signal with a first generic-chip-code signal embedded therein, toward a second cell having a second base station for transmitting a second spread-spectrum-communications signal with a second generic-chip-code signal embedded therein, said spread-spectrum-CDMA-communications system having a control unit for switching message data, spread-spectrum processed with a message-chip-code signal embedded in the first spread-spectrum-communications signal transmitted from said first base station, to the second spread-spectrum-communications signal transmitted from said second base station, said method comprising the steps of:

detecting the first generic-chip-code signal embedded in the first spread-spectrum-communications signal communicated from said first base station and outputting a first detected signal;
detecting the second generic-chip-code signal embedded in the second spread-spectrum-communications signal communicated from said second base station and outputting a second detected signal;
generating a comparison signal by comparing the first detected signal with the second detected signal;
despreading, using message-spread-spectrum-processing means, the spread-spectrum-communications signal as a modulated-data signal;
synchronizing, in response to the comparison signal being greater than a threshold, said message-spread-spectrum-processing means to the first generic-chip-code signal for processing the first spread-spectrum-communications signal transmitted from said first base station; and
synchronizing, in response to the comparison signal being less than the threshold, said message-spread-spectrum-processing means to the second generic-chip-code signal for receiving the second spread-spectrum-communications signal transmitted from said second base station.

* * * * *